Oct. 25, 1938.     E. B. G. LEFEVRE     2,134,135
ADJUSTABLE SEAT FOR VEHICLES
Filed Aug. 23, 1937     2 Sheets-Sheet 1
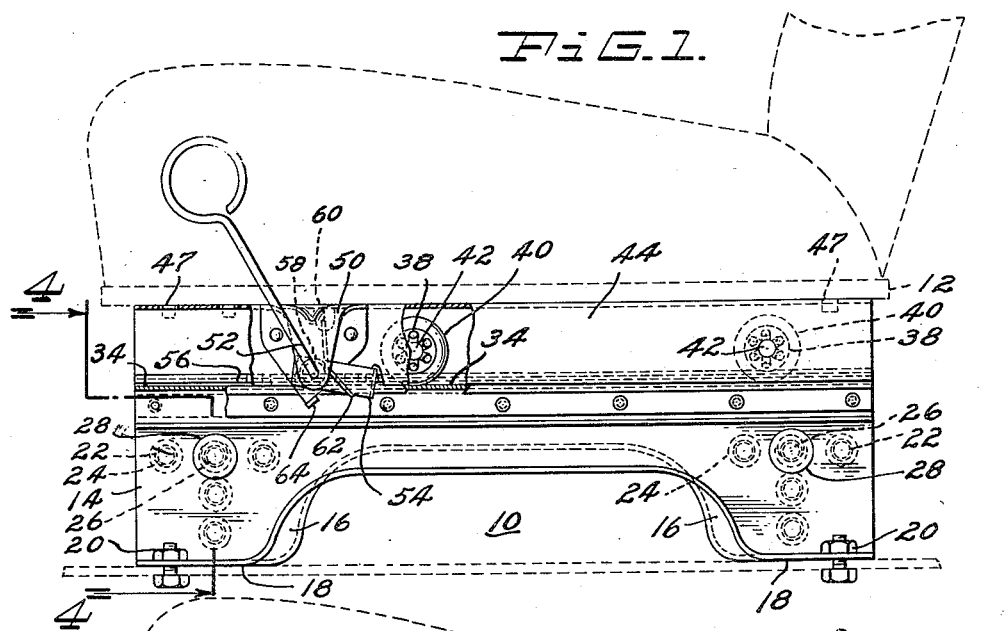
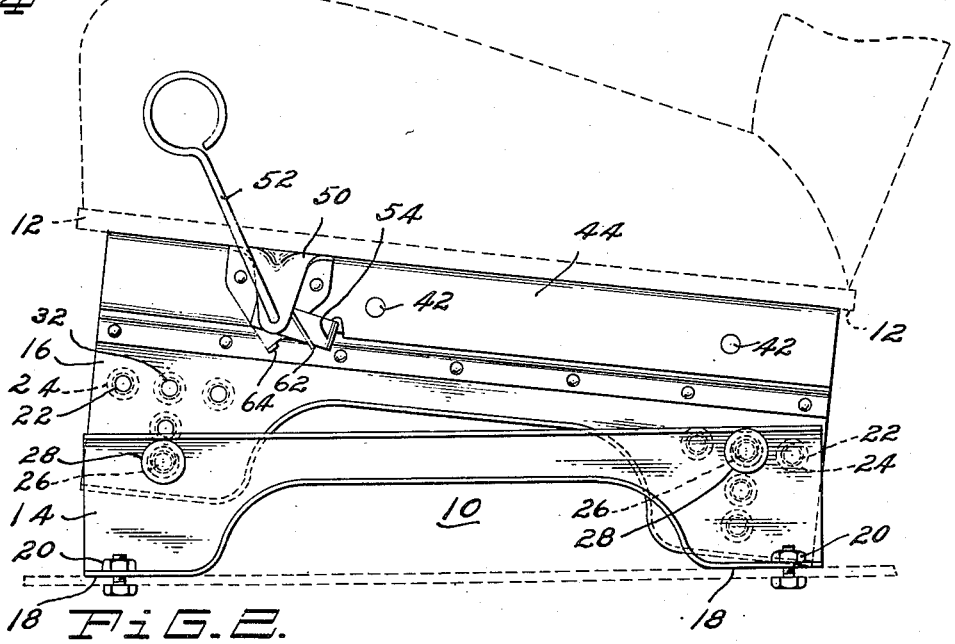
INVENTOR.
Emil B. G. Lefevre
BY Parker & Burton
ATTORNEYS

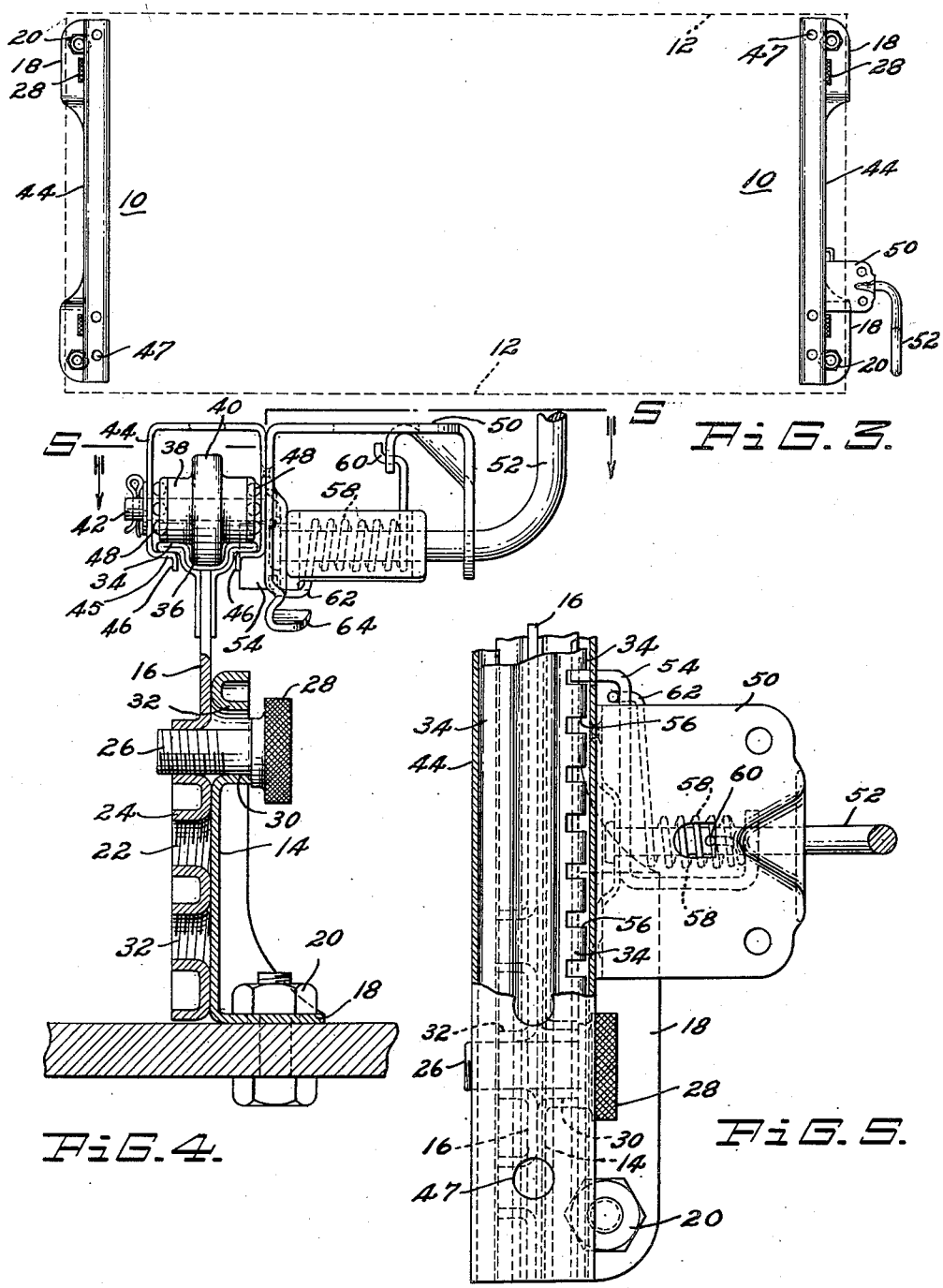

Patented Oct. 25, 1938

2,134,135

UNITED STATES PATENT OFFICE 2,134,135

ADJUSTABLE SEAT FOR VEHICLES

Emil B. G. Lefevre, Detroit, Mich.

Application August 23, 1937, Serial No. 160,434

9 Claims. (Cl. 155—90)

This invention relates to adjustable seat constructions particularly adapted for use in vehicles.

Heretofore, the practice has been to adjust the seats in vehicles, such as the driver's seat, forwardly and rearwardly of the automobile in a given path of movement. If a difference in height or inclination of the seat was possible by such a construction it was only incidental to the longitudinal adjustment and then only to certain prescribed heights and angles proportionate to the extent of longitudinal adjustment of the seat in the vehicle. In such constructions an average satisfactory result was obtained. The seat, however, could not be adjusted to individual requirements and in many cases individuals of non-average proportions were required to occupy the seat in very awkward positions during the time they possessed the vehicle without being able to rectify this condition.

It is an important object of this invention to provide a novel seat construction for vehicles which enables an occupant or the driver of the vehicle to finely adjust the seat to his complete satisfaction. This is a particular benefit to those persons of non-average build and those who may be physically incapacitated in some way. This novel seat construction is easily regulated to a large number of positions longitudinally of the vehicle and to various heights and inclinations in the vehicle. Novel mechanism is provided for locking the seat in the desired position. An important feature of the invention is the provision of novel means providing slidable movement forwardly and rearwardly in the vehicle at any selected height or inclination. As a result of this feature, the driver of the vehicle is able to adjust his seat to a position spaced from the steering mechanism and the operating pedals best suited to him and also to select a height and inclination at such position which enables him to operate the controls of the vehicle with the greatest of ease.

Another important object of this invention is to provide a novel seat supporting construction including a track and roller mechanism for providing longitudinal slidable adjustment of the seat in the vehicle. The track and roller mechanism is constructed in a novel manner to prevent transverse movements of the seat. More specifically, the track is provided with a longitudinal groove between the side edges thereof into which a circular projection on the roller mechanism enters. The roller mechanism is so shaped that the load of the seat is taken through bearing surfaces on opposite sides of the circular projection, while the circular projection itself contacts the opposite sides of the groove to restrain the seat from the transverse movement. An important feature of this construction is the provision of roller bearing devices associated with the roller mechanism for reducing the friction and increasing the ease of operation.

Another object of this invention is to provide a device accomplishing the above results which is simple and rugged in construction and easily operated and locked in the desired adjusted position.

Various other objects, advantages, and meritorious features of the invention will appear more fully from the following specifications, appended claims, and accompanying drawings, wherein:

Figure 1 is a side elevation of the seat support showing a seat and back therefor in dotted outline, Fig. 2 is a side elevation similar to Fig. 1 except that the seat support has been adjusted so that the seat is inclined rearwardly, Fig. 3 is a top view of a floor of a vehicle showing the disposition of seat supports on the floor, Fig. 4 is a cross-sectional view through line 4—4 of Fig. 1, and Fig. 5 is a detailed view on line 5—5 of Fig. 4, partially broken away to show the interior construction.

Referring to the drawings in detail, Figs. 1, 2, and 3 illustrate the manner in which the adjustable seat supporting devices of this invention are mounted upon the floor of a vehicle. In the present embodiment of the invention two such supporting devices are provided for supporting the vehicle seat. As shown in the top view in Fig. 3, the two devices generally indicated at 10 are spaced apart and are preferably mounted adjacent the side edges of the seat, the outline of which is indicated in dotted lines at 12. One of these devices is provided with a mechanism for releasably locking the seat in longitudinal adjusted position in the vehicle. Such a mechanism may be omitted from the other device since one is all that is required for locking the devices constructed in accordance with this invention.

The action of the adjustable seat supporting devices is illustrated in Figs. 1 and 2. Each of these figures illustrate one position to which the seat may be adjusted. In Fig. 1 the supporting devices support the seat in horizontal position. The seat may be adjusted to various heights both in horizontal and inclined position. In Fig. 2 the devices support the seat at its maximum backward inclination. These devices are capable of tilting the seat forward the same degree as inclined backward as in Fig. 2. Between these two extremes of inclination, it is possible to adjust the seat to various other raised and inclined positions. Irrespective of what height or inclined position is selected the seat may be slidably adjusted forward or backward by the devices. As a result, it is possible to obtain practically universal adjustment of the seat within the extremes of inclination and longitudinal adjustment provided for the seat. The occupant of the seat can therefore adjust the seat to suit his individual requirements.

Each device generally indicated at 10 comprises two elements or metal plates 14 and 16 extending in vertical side-by-side relationship. Element 14 is provided with means for securing the same to a fixed support in the vehicle such as the floor, chassis or body of the vehicle. Element 16 is provided with means for securing the same to a seat such as the bottom thereof as shown in the drawings. These elements are of a length substantially equal to the width of the seat, and are provided at their opposite ends with novel adjustable fastening mechanisms for securing the elements together in a plurality of angular positions relative to one another.

Element 14 comprises a metal plate flanged out at its bottom edge to provide floor engaging sections 18 through which bolts 20 may extend to secure the plate to the floor in upright position. Element 16 is formed of a similar sheet of metal. To secure plate 16 to plate 14 in a plurality of angular positions, apertures are formed in the opposite ends of the plates and by bringing certain of these apertures into alignment fastening elements may be inserted through the aligned apertures to secure the plates together.

As shown in Fig. 1 and in detail in Fig. 4, one of the plates, in this particular embodiment plate 16, is provided with a series of spaced apertures 22 at each end thereof which may be formed in the plate by subjecting the same to suitable dies. When thus formed each aperture 22 is provided with a circular wall 24 encircling the aperture and projecting from one side of the plate. As shown the inner surfaces of these circular projections may be threaded to receive the threaded extremity of bolts 26 or other types of fastening elements. These bolts may be provided with an enlarged knurled head 28 to facilitate rotation.
Hexangular headed bolts may be used in place of the knurled headed bolts. Instead of threading the inner sides of the circular walls 24, plain holes may be provided in the plates 14 and 16, and a suitable fastener element may be inserted in aligned holes to secure the plates together in adjusted position.

As shown in Figs. 1 and 2 the series of apertures 22 at one end of the plate 16 corresponds to that provided at the other end. The spacing of the apertures in each series should correspond in order that a variety of raised and inclined seat positions may be provided. Any desired grouping of the apertures at the opposite ends of the plates may be made. Certain of the apertures 22 in each series are mounted in vertical or substantially vertical alignment as shown in the drawings. The vertically aligned apertures in each series provide vertical as well as inclined adjustment as will be more particularly described hereinafter.

Plate 14 is likewise provided with one or more apertures adjacent its opposite ends. In the present embodiment of the invention only one aperture 30 is provided at each end of plate 14. More may be provided if desired, and any grouping of such apertures at opposite ends of the plate may be made. The apertures 30 may, like apertures 22 in plate 16, be formed by dies which provide a circular wall 32 surrounding the apertures. When plates 14 and 16 are assembled together as shown, the projections 24 and 32 extend from the outer faces of these plates. The openings or apertures 30 in plate 14 are spaced a predetermined distance apart so that when the plates are in parallel or horizontal relationship the axes of apertures 30 project through a center line drawn through the vertically aligned apertures in each group of apertures in plate 16. However when plate 16 assumes an inclined position relative to plate 14, this relationship does not exist. That is to say, if a fastening element were inserted through aligned apertures at one end of the plates, and plate 16 was pivoted about such element, all the apertures in the free end of plate 16, except that which is on a level with the aperture in which the element is fastened, will be out-of-line with the aperture 30 at the unfastened end of plate 14. In order to insure that at any adjusted position sufficient clearance will be provided through the apertures to receive the threaded bolts 26, the apertures 30 of plate 14 are oversize the fastening elements or bolts as shown in Fig. 4. The oversized extent of the apertures 30 should be sufficient at the maximum inclinations to provide clearance to permit insertion of the bolts through the desired apertures in the plates regardless of the inclination of plate 16 to plate 14.

As previously mentioned, the seat supporting devices include mechanism for slidably adjusting the seat longitudinally in the vehicle. Means is associated with this mechanism for releasably locking the seat in any position in its longitudinal movement. This mechanism comprises a track 34 carried upon the top edge of plate 16 of each device 10. As shown in Fig. 4, this track may be formed by folding a strip of metal on opposite sides of plate 16 and across the top edge thereof. This track extends longitudinally of the vehicle substantially the width of the seat. A groove 36 is formed in this track between the side edges. A plurality of specially formed rollers 38 having circular projections 40 carry the load of the seat upon the track 34. As shown in Fig. 4 the circular projections on these rollers enter the groove 36 but the groove is of such a depth that the peripheral surfaces of these projections do not contact the bottom of the groove. The load of the seat is taken by the track 34 from the rollers on opposite sides of the projection 40. It will be noted however that the circular projections 40 on each roller bear upon the opposite sides of the grooves 36. This acts to retain the roller against transverse movement while permitting free longitudinal movement of the seat in the vehicle.

Each roller 38 is journalled to a stud shaft 42 which is fixed in the opposite side walls of a channel shaped housing 44 surmounting the track 34. As shown in Fig. 4 the side walls of the housing 44 are turned inwardly at 45 in overlapping relationship with the track 34. This restrains the housing 44 from upward movement relative to the track. The margins of these inwardly bent portions are bent downwardly at 46 on opposite sides of the groove 36 and form strengthening ribs restraining the side walls of the housing from accidental outward springing thus releasing the housing for upward movement from the track. The closed ends of the channel shaped housing extends in spaced relationship above the rollers 38 and is provided with openings 47 for receiving fastening elements to secure the housing to the bottom of the seat.

The roller mechanism 38 is provided on its opposite ends with a novel bearing cage supporting in circular formation a plurality of roller bearings 48. These bearings as apparent in Fig. 4 contact the side walls of the channel shaped housing and as the roller mechanism travels along the track rotate around the stud shafts 42. These roller bearings reduce the friction and increase the ease of operation.

Associated with one of the seat supporting devices is a mechanism for releasably locking the seat in slidably adjusted position. This mechanism comprises an inverted U-shaped bracket 50 secured at one edge to the channel shaped housing 44 and extending laterally therefrom toward one side edge of the seat. This bracket carries a crank arm 52 which extends through the spaced side walls of the bracket. This arm carries on its inner extremity a latching element or dog 54 which is capable of interlocking with slots 56 formed along one edge of the track 34 as is clearly apparent in Fig. 5. A coiled spring 58 encircles the crank arm 52 within the bracket and is fixed at one end 60 to a stationary part of the bracket and fixed at its other end 62 to the locking dog 54. The action of the spring is such that it yieldably opposes manual force exerted on the crank arm 52 to withdraw the locking dog 54 from the slots in the track. A stop member 64 is provided for restricting the amount of movement that the locking dog 54 can be actuated.

The operation of the device is readily apparent from the description thus far made of the invention. Briefly, when it is desired to vary the height of the seat or alter its inclination, a knurled bolt 26 is withdrawn from aligned apertures at one end of the plates 14 and 16 while the other bolt is retained so that during the adjustment the seat may be swung around the retained bolt as a fulcrum. By comparing Fig. 1 with Fig. 2 it is noted that the seat has been adjusted to its maximum rearward inclination. The bolt in the forward end of the supporting plates has been transferred from one of the top apertures 22 in plate 16 to the bottom aperture. If a similar adjustment is made to the rear bolt, the seat will be returned to a horizontal position but at an increased height in the vehicle. Whatever raised or inclined position is selected the seat may be slidably adjusted longitudinally of the vehicle by operating the crank arm 52 to release the locking dog 54.

In addition to the longitudinal adjustment provided by the track and roller mechanism, the horizontally spaced apertures in each group of apertures provide longitudinal adjustment of the seat. If the adjustment forward and backward provided by the track is insufficient, the plate elements 16 may be shifted endwise to present any one of the three horizontally spaced apertures 22 opposite the apertures 30 in plates 14. This will bodily shift the track 34 and associated mechanism either forwardly or backwardly in the vehicle and increase the length of longitudinal adjustment. It is obvious that more than one row of horizontally spaced apertures 22 may be provided in order to provide extensive longitudinal adjustment on several levels or that the number of horizontally spaced holes in each group may be increased beyond the three illustrated in the drawings in order to extend the longitudinal adjustment if desired.

The contacting relationship between the circular projections 40 on the roller mechanisms 38 and the sides of the grooves 36 prevent the seat from travelling in any direction but that along the path provided by the tracks. Heretofore it has been necessary to provide a shaft extending between the channel housings 44 on each of the spaced supporting devices 10—10. Gear wheels were associated with this shaft adjacent each of these devices for interlocking engagement with teeth formed on the inner side edges of the tracks 36. The purpose of such a construction was to join the supporting devices together and to prevent transverse movement of the seat. This relatively expensive construction has now been eliminated by the simple procedure of shaping the roller mechanisms 38 with a circular projection 40 and providing the tracks 34 with a groove into which such projections may enter.

What I claim is:

1. An adjustable support for automobile seats comprising, in combination, a pair of metal plates of a length substantially equal to the width of the seat to be supported, means on one of said plates to secure the same to a support in an automobile, means on the other plate to secure the same to a seat to support the same, said metal plates having one or more apertures formed therein adjacent the opposite ends thereof, said apertures spaced relative to one another so that they may be brought into alignment by shifting or tilting the plates with respect to one another, and projecting circular wall portions formed around each of said apertures on one side of each plate by the extension of the metal in the plates under die pressure, said plates arranged in side-by-side relationship with the circular wall portions projecting from the outer sides of the plates, the inner surface of certain of said circular wall projections being threaded to receive a threaded fastening element.

2. An adjustable support for automobile seats comprising, in combination, a pair of metal plates having a length substantially equal to the width of the seat to be supported, means on one of said elements for securing the same in a vertical plane to a support, means on the other plate for securing the same to a seat to depend therefrom in a vertical plane, one of said plates having a group of apertures adjacent each of its opposite ends, the other of said plates having at least one aperture adjacent each of its opposite ends adapted to be brought into alignment with one of each group of apertures in the other plates, one of said metal plates being deformed by die pressure to provide circular wall projections surrounding its apertures and extending from the side of the plate opposite to the other plate, said projections being internally threaded, and an externally threaded bolt adapted upon insertion through aligned apertures of the plates and threaded engagement with the circular projection associated therewith to draw the plates together.

3. An adjustable support for automobile seats including, in combination, a flat metal plate of a length substantially equal to the width of the seat to be supported, a second flat metal plate of similar length, the opposite ends of said plates being deformed by die pressure to form circular bolt receiving holes and integral hollow projections on one side of each plate surrounding each hole thus formed, the holes at one end of the plates corresponding in arrangement and formation with those at the other end of the plates so that by movement of the plates relative to one another various combinations of aligned holes may be arranged, said hollow projections all extending from one side of each plate so that the plates may be brought into side-by-side relationship with the hollow projections on the outside surface of each plate, and externally threaded fastening bolts insertable in aligned holes of the two plates to draw them together in self supporting relationship, certain of said projections being internally threaded so that the fastening bolts may be threaded thereto when inserted through aligned holes of the plates.

4. An adjustable support for automobile seats including, in combination, a pair of flat metal plates of a length substantially equal to the width of the seat to be supported, and assembled together in contactual side-by-side relationship, the opposite ends of said plates having one or more circular bolt receiving holes extending completely therethrough and spatially arranged so that the plates are adjustable relative to one another to a plurality of positions wherein at least one hole in each end of one plate is brought into alignment with a hole in the adjacent end of the other plate, hollow projections encircling the holes of one of said plates and extending from the side thereof opposite to the side against which the other plate bears, said hollow projections being internally threaded, hollow projections encircling the holes of the other plate and extending from the side thereof opposite to the first mentioned plate, and headed fastening bolts removably receivable through aligned holes in said plates, said bolts having externally threaded extremities adapted when threaded to the projections on one of the plates with the heads of the bolts on the opposite side of the other plate to draw the plates tightly together in seat supporting relationship.

5. In combination with a motor vehicle having an occupant compartment including a floor and a seat therein, a pair of devices adjacent the opposite ends of the seats for adjustably supporting the seat from the floor, each device comprising two flat metal plates one of which is secured to the floor in an erect position crosswise to the length of the seat and the other of which is secured to the seat so that it extends closely alongside of the other plate, one plate of each device arranged on the outside of the device and constituting the outer plate while the other plate of each device constitutes the inner plate, the opposite ends of said plates having one or more circular bolt receiving holes extending therethrough, the holes at each end of the plates so spatially arranged that various combinations of aligned holes can be formed between the plates of each device by movement of the plates secured to the seat relative to the plates secured to the floor, hollow bosses on the inner facing side of the inner plate of each device and on the outer facing side of the outer plate of each device surrounding the holes therein, the hollow bosses on the inner plate being internally threaded, and bolts insertable through aligned holes in the plates of each device to supportingly secure the same together, said bolts having externally threaded extremities for threaded engagement with the hollow bosses on the inner plates and adapted to be inserted through the hollow bosses on the outer plate and threaded to the bosses on the inner plate to fasten the plates tightly together.

6. The invention described in claim 5 characterized by the fact that the holes and the hollow bosses surrounding the same in the outer plate of each device are oversize the fastening bolts sufficient to allow insertion of the bolts through aligned holes in both plates of each device when the plates secured to the seat are tilted relative to the floor secured plates with which each is associated.

7. An adjustable support for seats in motor vehicles including, in combination, a pair of flat relatively thin metal plates disposed side-by-side in parallel planes, the opposite ends of said plates having bolt receiving holes spatially arranged therein so that bodily movement of one plate relative to the other will bring a hole at each end of one plate into alignment with a hole at each end of the other plate, integral formed hollow projections formed on the outer side of one of said plates around each hole therein, said hollow projections being internally threaded, and externally threaded fastening bolts extending through aligned holes in said plates and threaded to the internally threaded hollow projection of one of the plates through which it extends, the head of said fastening bolts positioned upon the outer side of the other plate and acting to draw the plates tightly together when the bolts are threaded in their respective hollow projections.

8. An adjustable support for automobile seats including, in combination, a pair of relatively thin flat metal plates, said plates deformed under die pressure to form a circular bolt receiving hole in each plate and an integral hollow projection on one side of each plate surrounding each hole thus formed, said hollow projections extending from one side of each plate so that the plates may be brought into side-by-side relationship with the hollow projections on the outer faces of each plate, one of said hollow projections being internally threaded, and a fastening bolt adapted to be inserted through the holes of the two plates and having an external thread on its shank threadedly engageable with the internal thread on said hollow projection, said bolt acting when thus inserted and threaded to draw the plates together into tight clamped engagement.

9. An adjustable support for automobile seats including, in combination, a pair of relatively thin flat metal plates of lengths substantially equal to the width of the seat to be supported and arranged in parallel planes closely adjacent one another, the opposite end sections of said plates deformed under die pressure to form circular bolt receiving holes and integral hollow projections on the outer side of each plate surrounding each hole thus formed, the holes in the end sections of said plates so spatially arranged that various combinations of aligned holes in these sections can be found by movement of the plates relative to one another, and fastening bolts insertable in aligned holes in the end sections of said plates, said bolts being of a length to extend from the hollow projection on the outer side of one plate to the hollow projection on the outer side of the other plate and contactually bearing against the inner surfaces of said hollow projections through which they extend to sustain the load on the seat.

EMIL B. G. LEFEVRE.